United States Patent Office 3,466,458
Patented Sept. 9, 1969

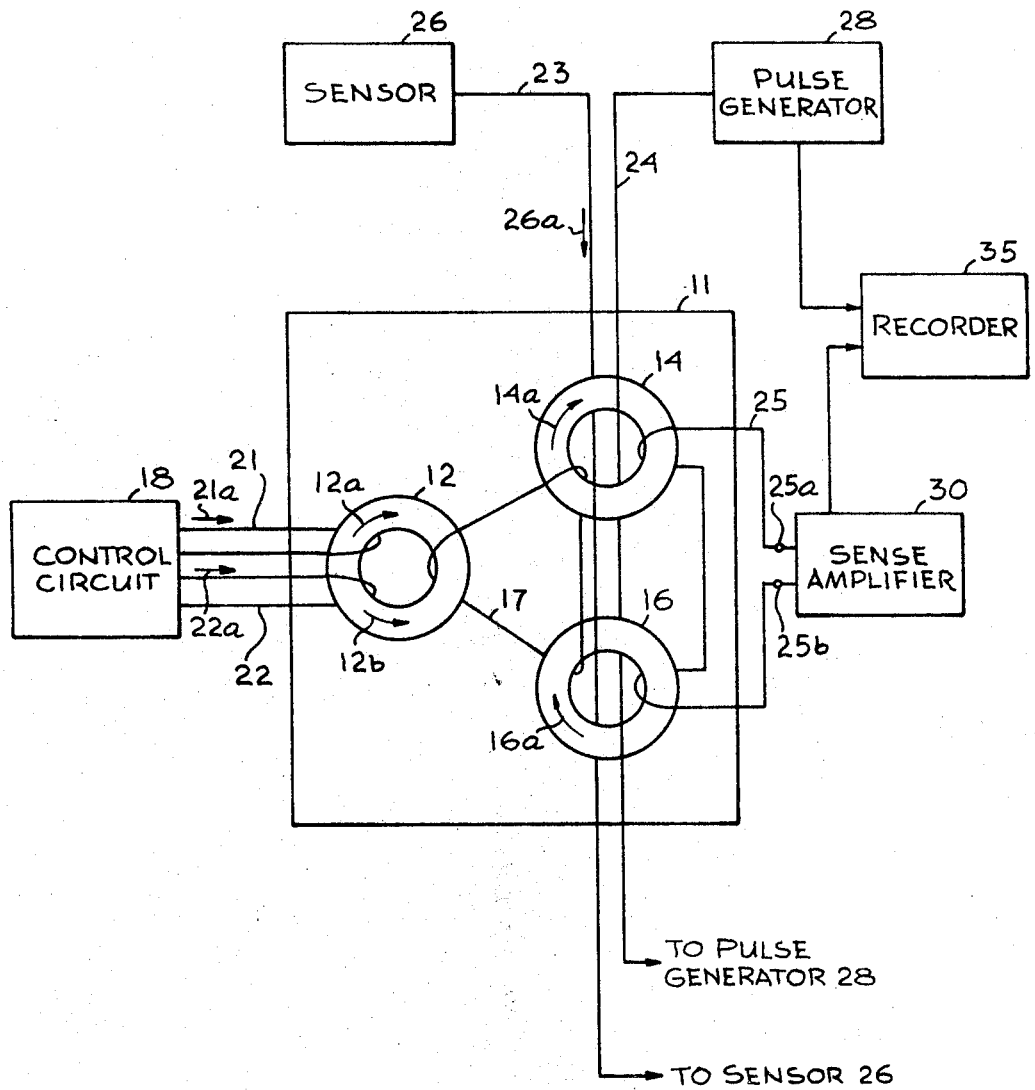

3,466,458
MAGNETIC COMPARING CIRCUIT
Clarence H. Heckler, Palo Alto, and James A. Baer, Menlo Park, Calif., assignors to Stanford Research Institute, Menlo Park, Calif., a corporation of California
Filed July 6, 1965, Ser. No. 469,679
Int. Cl. H03k 5/20
U.S. Cl. 307—88                    11 Claims

ABSTRACT OF THE DISCLOSURE

A magnetic comparing circuit with two identical cores, each being inductively coupled to two separate sources of input signals which are to be compared. A control winding, which inductively couples the two cores, is used to partially switch them from one state of magnetic remanence to another. Only when the amplitudes of both input signals are equal is a zero amplitude output signal present in an output winding, which inductively couples both cores. One input signal source is a sensor, while the other is a generator of pulses of adjustable amplitudes.

---

This invention relates to a magnetic core circuit and, more particularly, to a comparing circuit utilizing magnetic cores.

Many presently known sensors or transducers produce very low amplitude analog output signals which are related to the particular phenomena the transducers are designed to sense. Therefore, before such output signals can be properly interpreted, they need be accurately amplified. The need for amplification is nearly always required if the output signals are to be coded, such as into a digital code. Since accurate amplification can only be accomplished with relatively expensive circuitry, the cost and overall complexity of obtaining coded signals related to sensed phenomena by present-day circuits is quite high.

Accordingly, it is an object of the present invention to provide a novel circuit for accurately recording both low and high amplitude signals as well as mixed amplitude signals without amplification.

Another object of the invention is to provide a novel and simple circuit for accurately measuring a low amplitude analog signal.

Still another object of the invention is the provision of a relatively simple circuit for coding a low amplitude analog signal without amplification.

A further object of the present invention is the provision of a novel magnetic comparing circuit for producing coded signals related to low amplitude analog current signals.

These and other objects of the invention are achieved by providing a magnetic comparing circuit which includes magnetic toroids inductively coupled in such a way that an output voltage signal is produced only when two input current signals are of unequal levels or amplitudes. One of the input signals is an unamplified current signal such as is produced by a sensor, the amplitude of which is to be measured. The second input signal has an amplitude which is controllably varied to equal the unknown amplitude of the signal from the sensor so that when the output voltage signal of the circuit is zero, the amplitudes of the two input current signals are known to be the same. Thus, the unknown amplitude of the current signal from the sensor is determined by adjusting the amplitude of the second current signal until the output voltage signal of the circuit is substantially zero. The determination of the amplitude of the unknown current signal is accomplished without having to first amplify the signal from the sensor.

The second input current signal may be supplied from a source that generates pulses of current which have accurately known amplitudes. Pulses of different amplitudes, representing different coded digital values, are sequentially applied to the circuit so that when the output voltage signal of the circuit is zero, the coded digital value of the amplitude necessary to produce such zero output voltage represents the unknown amplitude of the current signal from the sensor.

The novel features that are considered characteristic of this invention are set forth with particularity in the appended claims. The invention itself both as to its organization and method of operation, as well as additional objects and advantages thereof, will best be understood from the following description when read in connection with the accompanying drawing, which is a combination block and schematic diagram of the novel magnetic comparing circuit of the present invention.

Referring to the drawing, there is shown a magnetic comparing stage 11 comprising a toroid 12, hereafter also referred to as the flux source toroid, and a pair of toroids 14 and 16. Each of the toroids is formed of homogeneous ferromagnetic material having two states of magnetic remanence, hereafter referred to as the "set" and "clear" states. In the "clear" state, the magnetic lines of flux in each toroid are assumed to be in a clockwise direction, as indicated by arrows 12a, 14a, and 16a. Let it further be assumed that the three toroids are all similar to one another, each having a unit of flux capacity, and that toroids 14 and 16 have identical switching dynamic capacities.

As seen from the drawing, a coupling loop 17 inductively couples flux source toroid 12 to toroids 14 and 16. A control circuit 18 is inductively coupled to toroid 12 by a read winding 21 and a reset winding 22, which are threaded through the toroid in opposite senses or polarities. Stage 11 is activated by a current pulse, hereafter referred to as the read pulse, from the control circuit 18 applied to the winding 21 in a direction indicated by arrow 21a. The read pulse is chosen to be of sufficient amplitude to saturate toroid 12 in its "set" state by completely switching the flux therein to be in a counterclockwise direction as indicated by arrow 12b.

As seen from the drawing, windings 23, 24 and 25 which are connected to a sensor 26, a pulse generator 28 and a sense amplifier 30, respectively, are threaded through toroids 14 and 16. Each of windings 23, 24 and 25 is threaded through each of the two toroids in an opposite sense or polarity. In the absence of current in windings 23 and 24, the change of unity flux in toroid 12, due to a read pulse, induces a current in the coupling loop 17 which affects the flux in toroids 14 and 16. Assuming the coupling loop 17 lossless and toroids 14 and 16 to be a perfectly matched pair, the current induced in loop 17 will switch the direction of one-half of the flux in each of toroids 14 and 16 from the clockwise direction as indicated by arrows 14a and 16a to a counterclockwise direction. However, as long as the change of flux in both toroids (14 and 16) is the same, zero voltage will be induced in winding 25 so that the net voltage drop across terminals 25a and 25b to which winding 26 is connected is zero. Namely, the output voltage signal of the circuit 11 is zero, so long as the change in flux in each of toroids 14 and 16 occurs at the same rate.

Let it be assumed that at a subsequent time, control circuit 18 provides a reset pulse induced in winding 22 in a direction indicated by arrow 22a The reset pulse should have a greater amplitude than the read pulse. The reset pulse switches toroid 12 to its "clear" state, inducing a current in coupling loop 17 which returns toroids 14 and 16 to their quiescent clear state. Since, however, the change in flux in both toroids occurs at the same rate, the output voltage signal in winding 25 will remain at zero amplitude during the resetting of the toroids.

If however, a low amplitude current signal is applied from the output of sensor 26, via winding 23, during a subsequent time when, due to a current in loop 17, the flux in each of toroids 14 and 16 is only partially switched, the amount of flux switching in the two toroids will not be the same. Consequently, a voltage signal will be induced in winding 25. The current signal from the sensor 26 flowing in the direction indicated by arrow 26a, is assumed to be small, so that by itself, it cannot switch either toroid (14 or 16). However, the current can modify the flux switching rate of the toroids. From the winding sense of windings 17 and 23, it is appreciated that a greater amount of flux is switched in toroid 16 than in toroid 14, thus inducing a voltage signal in winding 25.

The effect of the current from sensor 26 on the flux switching in toroids 14 and 16 can be eliminated by providing a current of equal magnitude or amplitude in winding 24 from the generator 28. According to the teachings of the present invention, the amplitude of the current from the generator 28 is adjusted until the output voltage signal in winding 25 is zero which is sensed by the sense amplifier 30. When this condition is reached, the known amplitude of the current from generator 28 equals the unknown amplitude of the current signal from sensor 26. As seen from the drawing, the pulse generator 28 and sense amplifier 30 are connected to a recorder 35. The function of the recorder 35 is to record the amplitude of the current from generator 28 when the input voltage to the amplifier is zero. Since, when the input voltage to amplifier 30 is zero, the currents from generator 28 and sensor 26 are equal, the recorded amplitudes also represent the amplitudes of the current from sensor 26.

The pulse generator 28 may generate pulses of current that have accurately known amplitudes, each amplitude representing a different digital code. When the stage 11 is actuated by a read pulse from control circuit 18 and a current of unknown amplitude is applied via winding 23 from the sensor 26, the generator 28 sequentially applies pulses of different amplitudes until the output voltage signal of stage 11 is sensed to be zero by amplifier 30. When this balanced condition is reached, recorder 35 records the digital code representing the amplitude of current from generator 28, necessary to equal the amplitude of current from sensor 26, the recorded digital code representing the unknown current amplitude of the current signal from sensor 26. This method of operation is known to those skilled in the art as the method of successive approximation.

From the foregoing description, it is thus seen that by supplying to stage 11 a low amplitude current signal, such as is provided by a sensor, the amplitude of the current can be determined without having to first amplify the current. The determination is made by comparing the current of unknown amplitude with a current of known amplitude and recording the known current amplitude when a balanced condition is achieved. The balanced condition is achieved when the output voltage signal of the novel stage 11 is zero, which indicates that the amplitude of the current signals are equal.

It should be appreciated that the novel magnetic comparing circuit of the invention is based on the detection of the differential flux switching which takes place in toroids 14 and 16 when the two current signals from sensor 26 and generator 28 are not of equal amplitudes. Thus, it should be appreciated that the current signal from the sensor 26 may be compared with the current signal from the generator either during the read period when a read signal is supplied from circuit 18, or when the reset signal is applied via winding 22 to reset the toroids 12, 14 and 16 to their clear state of magnetic remanence.

In one actual reduction to practice, it has been found that by threading reset winding 22 through toroids 14 and 16 so that all three toroids are switched to their clear state, the toroids 14 and 16 are driven by a greater magnetomotive force and the sensitivity of the circuit 11 is greately increased. Both cores are switched simultaneously toward their clear state. During a first portion of the switching period, both cores switch at virtually identical rates. Consequently, the effect of the switching of one core cancels the effect of the switching of the other core. However, one core stops switching before the other, thereby providing a clearly readable output. Thus, though in the foregoing description, the invention has been described in conjunction with measurements made during the read period, it may be more advantageous to perform the measurements during the reset period. It has been established that an unamplified current signal of several microamperes is detectable with the magnetic comparing circuit of the present invention having a dynamic range of several hundred to one.

There has accordingly been shown and described herein a novel and useful magnetic comparing circuit which is used to measure, as well as digitally code, very small amplitudes of current signals without having to first amplify such signals. It should be appreciated that those familiar with the art may make modifications in the arrangements as shown without departing from the spirit of the invention.

What is claimed is:
1. A magnetic comparing apparatus comprising:
a pair of toroids of magnetic material having clear and set states of magnetic remanence and being drivable therebetween, said toroids having substantially identical dynamic switching characteristics;
first means inductively coupled to said pair of toroids for switching a substantially equal amount of flux in each of said toroids by switching each toroid from said clear state toward said set state without fully driving the toroid to said set state;
second means inductively coupled to each of said toroids for applying two input current signals thereto to vary the amount of flux switched in each of said toroids from the amount of flux switched by said first means, as a function of the difference in the amplitudes of said input current signals; and
means for producing an output signal of substantially zero amplitude when the amplitudes of said input current signals are substantially equal.

2. A magnetic comparing apparatus comprising:
a flux source toroid of magnetic material having clear and set states of magnetic remanence and being drivable therebetween;
a pair of matched toroids of magnetic material having said clear and set states of magnetic remanence and being drivable therebetween, said toroids having substantially identical dynamic switching capacities;
a flux loop inductively coupling said flux source toroid with said pair of matched toroids;
first means for driving said flux source toroid from said clear state to said set state of magnetic remanence, to induce a current in said flux loop to switch an equal amount of flux in each of said toroids by driving each of said toroids from its clear state toward its set state without being fully driven to said set state when said flux source toroids is driven to its set state;
second means inductively coupled to each one of said toroids for differentially modifying the amount of flux switched in each of said toroids when each is driven from its clear state by said first means as a function of the difference in amplitudes of two input current signals supplied by said second means to each of said toroids; and means inductively coupled to said pair of toroids for providing an output signal as a function of the difference in the amount of flux switched and rate of flux switching in said pair of toroids by said first and second means, whereby said output signal is substantially zero when the amplitudes of said two input signals are equal.

3. A magnetic comparing apparatus comprising:

a flux source toroid of magnetic material having clear and set states of magnetic remanence and being drivable therebetween;

a pair of matched toroids of magnetic material having said clear and set states of magnetic remanence and being drivable therebetween, said toroids having substantially identical switching dynamic capacities;

a coupling loop inductively coupling said flux source toroid with said pair of matched toroids;

first means for driving said flux source toroid from said clear state to said set state of magnetic remanence, to induce a current in said coupling loop to switch an equal amount of flux in each of said toroids by driving each of said toroids from its clear state toward its set state without being fully driven to said set state when said flux source toroid is driven to its set state.

second means inductively coupled to said pair of toroids for inductively applying a first current signal of unknown amplitude and a second current signal of known amplitude to each one of said toroids to vary the amount of flux switched in each of said pair of toroids by said first means as a function of the difference in amplitudes of said first and second current signals applied to each toroid; and means inductively coupled to said pair of toroids for sensing the difference in the amount of flux switched and rate of flux switching in said pair of toroids to provide an output signal, whereby said output signal is of zero amplitude when said first and second current signals are of equal amplitudes.

4. An apparatus for comparing a first current signal of unknown amplitude with a second current signal of a variably controllable known amplitude to determine the unknown amplitude of said first current signal comprising:

a pair of matched toroids of magnetic material having clear and set states of magnetic remanence and being drivable therebetween, said toroids having substantially identical switching dynamic capacities;

first means for switching an equal portion of the flux in each of said toroids by driving said toroids from their clear state of magnetic remanence;

second means for driving said toroids toward their set state of magnetic remanence;

a first winding inductively coupled to said toroids for applying a first current signal of unknown amplitude to said toroids to differentially vary the amount of flux switched therein;

a second winding inductively coupled to said toroids;

a current generating means connected to said second winding for applying a second current signal of a known variably controllable amplitude to said toroids to affect the flux switched therein; and output means for providing an output signal related to the difference in the amount of flux switched and rate of switching in said toroids, said current generating means including means for varying the amplitude of said second current signal to reduce the amplitude of said output signal to zero, whereby the amplitude of said second current signal is in a known relationship to the unknown amplitude of said first current signal.

5. An apparatus as recited in claim 4 further including recording means coupled to said current generator means and said output means for recording the amplitude of said second current signal which reduces said output signal substantially to zero, said recorder amplitude corresponding to the unknown amplitude of said first current signal.

6. An apparatus as recited in claim 4 wherein the amplitude of said second current signal is controlled to vary by known fixed digitally coded increments to digitally code the unknown amplitude of said first current signal as a function of the digitally coded amplitude of said second current signal which reduces said output signal to zero.

7. An apparatus as recited in claim 6 further including recording means coupled to said current generator means and said output means for recording in digital code the amplitude of said second current signal which reduces said output signal to zero, said digitally coded amplitude corresponding to the unknown amplitude of said first current signal.

8. A magnetic comparing apparatus for determining the unknown amplitude of a first current signal by inductively applying the first current signal and a second current signal having a variable controllable amplitude to magnetic elements and by adjusting the amplitude of the second current signal to produce a balance condition indicating the equality of the amplitudes of the two current signals, said magnetic comparing apparatus comprising:

a flux source toroid of magnetic material having clear and set states of magnetic remanence and being drivable therebetween;

a pair of dynamically matched toroids of magnetic material having said clear and set states of magnetic remanence and being drivable therebetween, said toroids having substantially identical flux capacities;

a flux loop inductively coupling said flux source toroid with said pair of matched toroids;

first means for driving said flux source toroid between said clear and set states of magnetic remanence, to induce a current in said flux loop to switch an equal amount of flux in each of said pair of toroids from said clear state when said flux source toroid is driven to its set state, and to drive said pair of toroids toward their set states when said flux source toroid is driven to its set state;

a first winding coupled to said pair of dynamically matched toroids for applying a first current signal of unknown amplitude to said toroids to differentially vary the amount of flux switched and the rate of switching therein;

a second winding inductively coupled to said toroids;

a current generating means connected to said second winding for applying a second current signal of a known variably controllable amplitude to said toroids to affect the flux switched therein; and output means for providing an output signal related to the difference in the amount of flux switched in said toroids, said current generating means including means for varying the amplitude of said second current signal to reduce the amplitude of said output signal to zero, whereby the amplitude of said second current signal is in a known relationship to the unknown amplitude of said first current signal.

9. A magnetic comparing apparatus as recited in claim 8 further including recording means coupled to said current generator means and said output means for recording the amplitude of said second current signal which reduces said output signal, said amplitude corresponding to the unknown amplitude of said first current signal.

10. A magnetic comparing apparatus as recited in claim 8 wherein the amplitude of said second current signal is controlled to vary by known fixed digitally coded increments to digitally code the unknown amplitude of said first current signal as a function of the digitally coded amplitude of said second current signal which reduces said output signal to zero.

11. A magnetic comparing apparatus as recited in claim 10 further including recording means coupled to said current generator means and said output means for recording in digital code the amplitude of said second current signal which reduces said output signal to zero, said digitally coded amplitude corresponding to the unknown amplitude of said first current signal.

References Cited

UNITED STATES PATENTS

| | | | |
|---|---|---|---|
| 3,177,468 | 4/1965 | Ruoff | 340—174 |
| 2,870,406 | 1/1959 | Smith | 235—177 XR |
| 2,905,931 | 9/1959 | Lubkin | 340—174 |
| 3,032,663 | 5/1962 | Tillman | 340—174 XR |

BERNARD KONICK, Primary Examiner

G. M. HOFFMAN, Assistant Examiner

U.S. Cl. X.R.

340—146.2, 174